(12) United States Patent
Conkle et al.

(10) Patent No.: US 11,695,779 B2
(45) Date of Patent: *Jul. 4, 2023

(54) USER MANAGEMENT SYSTEM FOR COMPUTING SUPPORT

(71) Applicant: MSP Solutions Group LLC, Plano, TX (US)

(72) Inventors: Timothy Mark Conkle, McKinney, TX (US); Sage David Driskell, Allen, TX (US); Luke Matthew Glover, McKinney, TX (US)

(73) Assignee: MSP Solutions Group LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/756,953

(22) PCT Filed: Jan. 27, 2022

(86) PCT No.: PCT/US2022/014115
§ 371 (c)(1),
(2) Date: Jun. 6, 2022

(87) PCT Pub. No.: WO2022/165049
PCT Pub. Date: Aug. 4, 2022

(65) Prior Publication Data
US 2023/0109731 A1    Apr. 13, 2023

Related U.S. Application Data

(60) Provisional application No. 63/142,578, filed on Jan. 28, 2021.

(51) Int. Cl.
*H04L 9/26* (2006.01)
*H04L 9/40* (2022.01)

(52) U.S. Cl.
CPC ................... *H04L 63/105* (2013.01)

(58) Field of Classification Search
CPC ....................................................... H04L 63/105
(Continued)

(56) References Cited

U.S. PATENT DOCUMENTS 7,373,515 B2    5/2008    Owen et al.
8,578,454 B2    11/2013   Grim
(Continued)

FOREIGN PATENT DOCUMENTS

WO    2018157211 A1    9/2018

OTHER PUBLICATIONS

Federated system-to-service authentication and authorization combining PUFs and tokens, Beltran et al, Jul. 2017 (Year: 2017).*
(Continued)

*Primary Examiner* — Jahangir Kabir
(74) *Attorney, Agent, or Firm* — Holzer Patel Drennan

(57) ABSTRACT

A computing support system is configured to programmatically manage support access to a computing system via a support technician console across multiple levels of support access. The system receives a request to authenticate a user requesting support for the computing system, issues one or more authentication challenges to the user to authenticate the identity of the user, receives one or more corresponding authentication challenge responses from the user based on the authentication challenge, and verifies a level of authentication based on the authentication challenge response, the level of authentication being selected from multiple levels of authentication. The system also determines a level of support access to the computing system based on the verified level of authentication and the identity of the user and programmatically enforces limits on the support access to the computing system via the support technician console based on the determined level of support access.

16 Claims, 6 Drawing Sheets

(58) Field of Classification Search
USPC .............................................................. 726/9
See application file for complete search history.

(56) References Cited

U.S. PATENT DOCUMENTS

| | | | |
|---|---|---|---|
| 8,935,757 B2 | 1/2015 | Srinivasan et al. | |
| 9,088,562 B2 | 7/2015 | Driscoll et al. | |
| 9,473,915 B2 | 10/2016 | Zhao | |
| 9,674,106 B2 | 6/2017 | Reeves et al. | |
| 11,468,413 B1* | 10/2022 | Kurani | G06Q 20/3829 |
| 2007/0136573 A1 | 6/2007 | Steinberg | |
| 2016/0042360 A1 | 2/2016 | Dutta | |
| 2016/0180072 A1* | 6/2016 | Ligatti | G06F 21/40 |
| | | | 726/7 |
| 2016/0323450 A1 | 11/2016 | Disraeli et al. | |
| 2017/0279774 A1 | 9/2017 | Booz et al. | |
| 2019/0036932 A1 | 1/2019 | Bathen et al. | |
| 2019/0190724 A1 | 6/2019 | Sundaresan et al. | |
| 2020/0076798 A1* | 3/2020 | Lidsky | H04L 63/083 |
| 2020/0304542 A1 | 9/2020 | Ilincic et al. | |

OTHER PUBLICATIONS

Designing Authentication and Authorization System with Blockchain, Ezawa et al, Aug. 2019 (Year: 2019).*

"International Search Report and Written Opinion issued in PCT Application No. PCT/US2022/14115", dated May 4, 2022, 13 pages.

Robinson, Kelley, "How to add customer authentication to Twilio Flex", Twilio Inc. Blog, (obtained from: https://www.twilio.com/blog/sms-otp-authentication-flex on Jan. 27, 2022.), Jul. 22, 2020, 8 pages.

* cited by examiner

USER MANAGEMENT SYSTEM FOR COMPUTING SUPPORT

CROSS-REFERENCE TO RELATED APPLICATIONS

This application is a § 371 national phase filing of pending application number PCT/US2021/014115 entitled "User Management System for Computing Support" and filed on Jan. 27, 2022, which is related to and claims benefit of priority to U.S. Provisional Patent App. No. 63/142,578, entitled "Remote User Identification" and filed on Jan. 28, 2021, the entire disclosure of which is specifically incorporated herein by reference. This application is also related to U.S. patent application Ser. No. 17/586,445, entitled "User Management System for Computing Support" and filed Jan. 27, 2022.

BACKGROUND

Computing support technicians receive phone calls from users requesting technical support for a computing problem. Computing support is often referred to as IT (information technology) support. In many cases, the technician can verbally walk the caller through steps to correct the problem. In the immortal words of Roy Trenneman from the British sitcom, The IT Crowd, "Hello, IT. Have you tried turning it off and on again?" However, many computing problems require more complicated solutions, such as requiring the technician to reset a user's password, adjust a user's permission, alter a computer's configuration, etc. Some of these solutions may present a security risk, such as interrupting computing operations and deleting or providing unauthorized access to important company or personal data. As such, it is crucial that the technician can verify the identity of the user because a malicious caller posing as an authorized user can potentially persuade a technician to perform support actions that are not legitimately authorized.

Furthermore, even if the technician verifies or believes he or she has verified the user, there remains a question about the level of computing support the technician is permitted to provide that user. For example, a CTO may be authorized to instruct the technician to shut down a server, but his or her colleague may not have that authority. Yet, the colleague may call the technician to shut down the server and, even with the best intentions, may be acting without authorization. In a more malevolent scenario, the colleague may be a disgruntled employee attempting to sabotage the company's computing operations. Even if the technician's company policy sets out strict rules about which users have authority to request specific support operations, a sympathetic technician may innocently bypass the rules in order to solve the problem for the caller. Although the technician may face discipline for violating company policy, the damage may already be done. Accordingly, managing user verification and authorization by company policy alone is insufficient for a secure computing environment.

SUMMARY

The described technology provides a computing support system that is configured to programmatically manage support access to a computing system via a support technician console across multiple levels of support access, including base-restriction support access and multiple levels of granted support access. The computing support system receives a request to authenticate a user requesting support for the computing system. The request includes the identity of the user. The computing support system issues one or more authentication challenges via one or more data communication channels to the user to authenticate the identity of the user. The computing support system receives one or more corresponding authentication challenge responses via the one or more data communication channels from the user based on the authentication challenge. The computing support system verifies a level of authentication based on the authentication challenge response, the level of authentication being selected from multiple levels of authentication. The computing support system determines a level of support access to the computing system from the multiple levels of support access, the level of support access being determined based on the verified level of authentication and the identity of the user. The computing support system programmatically enforces limits on the support access to the computing system via the support technician console based on the determined level of support access.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
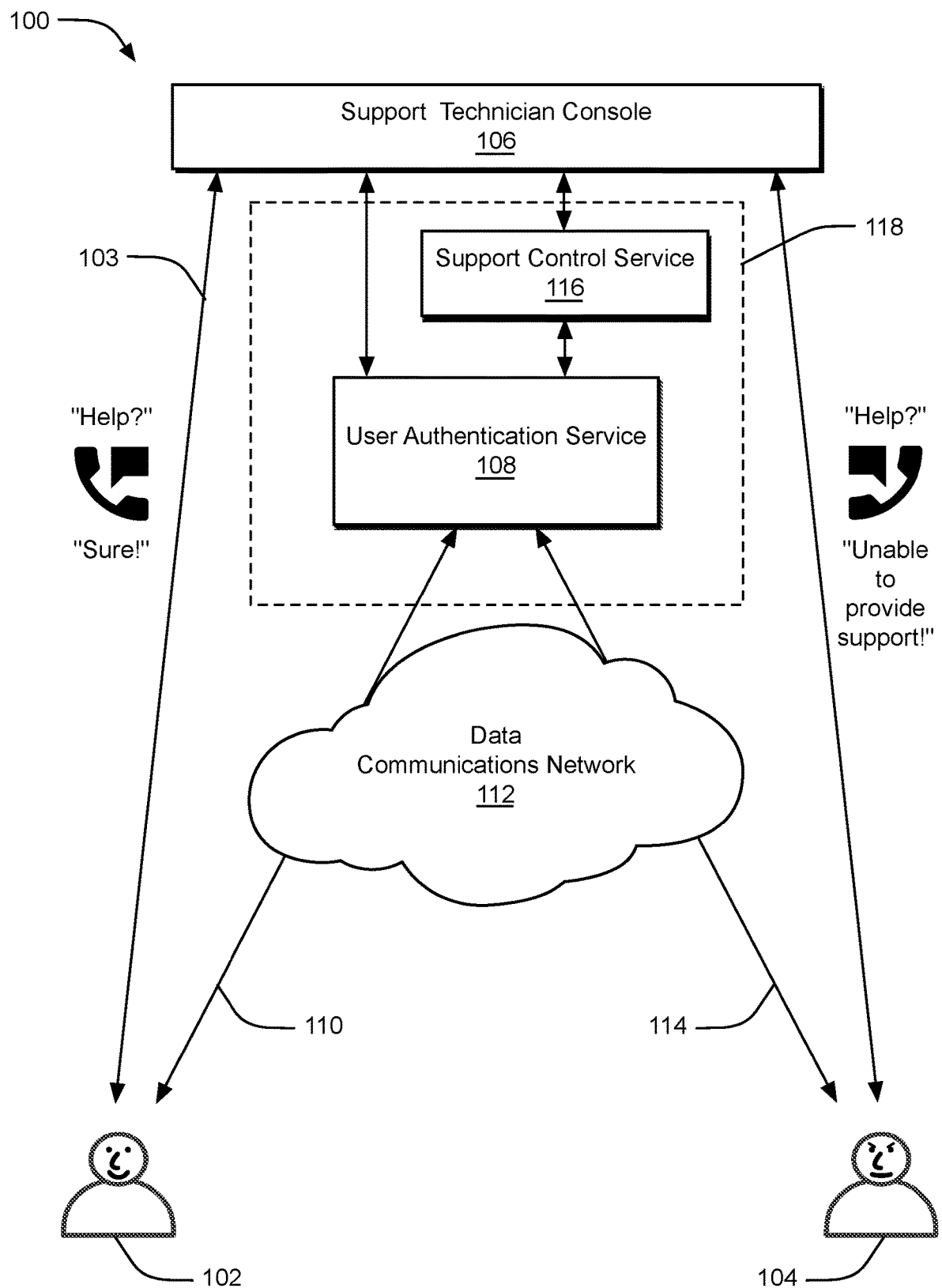
FIG. 1 illustrates an example computing support system in which a first user is authenticated and a second user is not authenticated.

Multi-Factor Authentication (MFA) can manage electronic authentication of a user attempting to access electronic assets, including without limitation websites, networks, applications, web services, user data, and financial assets. Access is granted if the user successfully presents two or more factors (e.g., items of evidence) to an authenticator, and the authenticator is able to validate such factors. Example factors may include without limitation information only the user knows, something only the user possesses, and something only the user is ("inherence"). Once the factors are validated, the authenticator can authorize access to the desired electronic assets.

In a typical scenario, a user attempts to login through a user interface (e.g., in a browser) to his or her web services account using a username and password (a first factor). If this first factor is validated, then a code (a second factor) is presented to the user through a communication channel expected to be only accessible by the user (e.g., an SMS message sent to the user's mobile phone number). The user is asked to enter the received code into the user interface to present this second factor to the authenticator. If the authenticator is able to validate both factors, then the user is granted access to the web service account.

Such MFA implementations are expected to be more secure than a single-factor authentication method because the probability of a malicious actor being able to complete the MFA successfully decreases with each additional factor. For example, a hacker may find a user's username and password on the "dark web" or through a phishing exploit, but the probability of that same hacker also gaining access to SMS messages sent to the user's mobile phone number is much lower, although not exactly zero. Other examples of factors may include without limitation a security token in a physical device (e.g., a USB stick, a cyber key, a physical ID card), a personal identification number (PIN), and biometric information.

However, while such MFA implementations are well suited in some workflows (e.g., authenticating a user logging into a website through a web browser), they are not well suited in other workflows, such as telephone-based tech support calls to a human tech support person where the user may be unable to access a locked mobile phone or a crashed computer. Instead, the user may be calling from a landline in an effort to gain tech support for a "bricked" mobile phone. Furthermore, in these scenarios, the introduction of a tech support person can decrease the security of the MFA implementation because the tech support person may be able to circumvent the company policy to override or circumvent the MFA. For example, an extremely needy or angry user may persuade the tech support person to provide tech support without formal compliance with the MFA requirements. In this manner, security to the electronic asset may be breached because of a tech support person who is overly eager to help or is bullied into bypassing the company policy.

In other scenarios, the non-zero probability of a malicious actor gaining access to more than one factor still exists. For example, usernames and passwords, mothers' maiden names, first grade teacher names, and PINs can be phished or otherwise discovered through hacking and other social engineering exploits. Likewise, SMS messages to mobile phone numbers can be intercepted, and fingerprints, voices, and other factors can be spoofed by such malicious actors.

In yet other scenarios, lax security compliance on the user's part can also increase the risk of faulty authentication. For example, a CEO may give his or her executive assistant username/password information and other factor information in order to have the assistant work with tech support to fix the CEO's computer while the CEO is unavailable. Although the CEO may wish the assistant to have some level of authorization for such tech support (e.g., authorize the tech support person to email a password reset link to the CEOs phone), the CEO likely does not want the assistant to have access to all tech assets (e.g., to wipe the CEO's hard drive, to download confidential company financial information, to gain access to company bank accounts). Inclusion of a tech support person, who may be persuaded by the assistant's ability to provide some of the needed factors, further increases the security risk of some undesirable level of access to system resources of the user.

User authentication and management for computing support can be upgraded significantly by improving the fidelity of user authentication and by removing or reducing the risk that an overly eager or flustered technician overrides or bypasses security protocols in the support workflow. Further, implementation of more secure and/or more numerous factors can enhance system security, particularly if the human technician is removed user authentication and management from the support provider side of the support workflow. Moreover, system security can be enhanced with computer-enforceable gradations of authentication combined with corresponding levels of authorized access to computing and data assets.

As computing support has evolved, some support providers have transitioned into managed service providers (MSPs). An MSP delivers services, such as network, application, infrastructure, and security, via ongoing and regular support and active administration on customers' premises and/or remotely. MSPs may deliver their own native services in combination with other providers' services (for example, a security MSP providing technical support on top of a third-party cloud infrastructure-as-a-service). Typical MSPs focus on a select number of vendors and technologies as their own core offerings. Many MSPs also coordinate services from other types of providers. The term "MSP" traditionally was applied to infrastructure or device-centric types of services but has expanded to include any continuous, regular management, maintenance, and support.

It should be understood that the described technology can also be used to other scenarios, including verifying the identity of anyone and access authority in relation to attempting access to a computer system and access to other accounts and spaces (e.g., bank accounts, web services, web sites, ATMs, vehicles, buildings, and other secured areas, etc.). For example, a bank may use such authentication and access control to manages access to a customer's bank account—through the described technology, a company can grant certain employees the ability to withdraw small amounts of cash from the company's bank account while granting the CEO the ability to withdraw larger amounts. In another example, a car owner may grant a teenager access to the car with certain limitations (e.g., a speed governor, a location tracker, a driving behavior monitor) while granting himself or herself unlimited, untracked, and unmonitored access.

FIG. 1 illustrates an example computing support system 100 in which a first user 102 is authenticated and a second user 104 is not authenticated. In a first scenario, the first user 102 calls an MSP helpdesk phone number via a telephone channel 103 to speak with a computing support technician. The technician provides support through a support technician console 106, which may include or have access to one or more of the following: a customer support portal, a remote monitoring and management (RMM) solution, remote access software, virtual private network (VPN) capabilities, a ticketing system, a professional service automation (PSA) system, other automation services, a customer relationship management (CRM) system, cybersecurity administration solutions, cloud storage and computing systems, an enterprise resource planning (ERP) solution, a telephone system, etc.

When the technician answers the phone, he or she may perform some rudimentary user identification (e.g., to identify the user as a current customer of the MSP) and to capture the nature of the user's computing problem. Some authentication may be provided via the support technician console 106, such as by checking the caller ID against the MSP's customer database. It should be noted that caller ID can be spoofed by bad actors, so this authentication method is not deemed secure, but it may be sufficient for no-risk support. If the phone number is different than the one in the database, the technician can capture other information the identify the user's name and/or company. With this identification, the support technician console 106 may present the technician with an initial user interface populated with information about the customer so that the technician can start to provide initial support. If the user cannot provide proper identification as a customer of the MSP, the technician can deny support services. MSP company policies are typically safe enough to manage this initial level of support, and the support technician console 106 enforces that at this stage by not presenting the technician with functionality that presents a security risk.

If the identified user requires more than an initial level of simple verbal support, the support technician console 106 will indicate that the technician must authenticate the user in order to gain access to more in-depth functionality and information. In some cases, various types of MFA may be sufficient for some levels of enhanced support, but in many cases, even MFA may not be sufficient. For example, if the MFA protocol requires that the user provide a temporary code from an email sent from the MSP, but the user is calling about being unable to access his or her email, then that factor is unavailable for authentication. In some cases, various authentication factors may be unavailable or unreliable (e.g., an email breach has been detected, a mobile phone has been stolen). Furthermore, such MFA protocols can be awkward for some users and time-consuming for both the user and the technician.

Nevertheless, MFA may be sufficient for some low-risk levels of support. In the context of a user calling a helpdesk, the user's company may elect to allow certain support actions based solely on MFA confirmation. However, the support workflow is different than the scenario of logging into a Web-based account. Rather than entering a username and password into a login screen followed by code a text or email sent to a mobile phone number or email address on record for the user, in the support workflow, the user is calling in by telephone to the helpdesk, and the technician answering the call needs to be able to authenticate the user with whom he or she is speaking. In this context, the technician can trigger the support technician console 106 to send an authentication challenge via a user authentication service 108 and a data communications channel 110 over a data communications network 112. If the first user 102 can satisfy the authentication challenge (e.g., one or more authentication factors for the MFA), then the technician is informed that the caller has been authenticated, and some level of support may be provided.

In one implementation, one of the authentication factors may require verification using an NFT (non-fungible token) and a blockchain ledger maintained by the MSP, the customer enterprise, or a third party. An NFT is a non-interchangeable unit of data stored on a blockchain. Examples of NFT data units may include digital files, such as images, videos, audio data that are securely and uniquely identifiable. The secure and unique aspects of an NFT authentication make NFTs a particularly effective authentication factor, as described in more detail with respect to other figures.

In one implementation, the authentication challenge is a code sent via text message, email, etc. The first user 102 is asked to recite the code back to the technician over the telephone channel 103, who is not informed of the code through any other means. Other factors may include answers to security questions known only to the authorized user, biometric data in a fingerprint detector or retinal scanner, a trusted authentication application, etc. With reference to the code, the technician enters the code into the support technician console 106, which checks with the user authentication service 108 to determine if the code entered matches the code sent to the first user 102. The responses from the first user 102 to these factors may be received through the data communications channel 110 by the user authentication service 108, which evaluates the received data against known information about the user (e.g., previously recorded fingerprints) stored in a user authentication datastore (not shown). If all (or a sufficient selection) of the authentication factors are verified, the user authentication service 108 informs the technician of the confirmed authentication so that the technician can provide more in-depth support.

In the second scenario, the second user 104 (a "bad" actor) calls the MSP helpdesk phone number via a telephone channel 103 to speak with the computing support technician. The technician can follow the same support workflow as he or she did with the first user 102, including the authentication challenge through a communication channel 114. However, in this scenario, the second user 104 fails to satisfy the sufficient number of authentication factors to be successfully authenticated. As such, then the user authentication service 108 informs the technician of the failed authentication, at which the technician notifies the second user 104 that he/she has failed authentication and no further (or no deeper) support can be provided per the MSP company support policy.

While this authentication approach has much-improved security over the user simply identifying themselves verbally over the phone to the technician, security can still be improved. In the description above, there is still the possibility of the bad actor (the second user 104) convincing ("Oh, please help me! If I don't get this problem fixed right now, I will lose my job!"), bullying the technician to provide deeper support ("I'm the CEO of this company, and if you don't do what I ask right now, I will cancel our support contract"), or some other persuasive ploy. Company policies are only as good as the technicians who follow them.

As such, FIG. 1 includes a support control service 116 that coordinates with the user authentication service 108 to programmatically enforce MSP company support policies. The support control service 116 and the user authentication service 108 may be subsystems of a unified authentication and control service 118, or they may be separate or distributed functions that assist the support technician console 106 in providing appropriate support actions to authenticated and authorized users. Further, in at least one implementation, the support control service 116 can also enforce authentication and support policies of the customer enterprise that employs the user. As such, based on the level of authentication satisfied by the user, the role of the user in the customer enterprise, and the support policies of the customer enterprise and the MSP, the support control service 116 disables or enables select support functions in the support technician console 106 so that the technician only has access to the support functions allowed and programmatically enforced by the policies. For example, based on a minimal authentication by a customer employee with a low computing authorization, the technician may only be presented with a user interface in the support technician console 106 to reset the user's password. In contrast, if the CTO of the customer passes a high level of authentication, the technician may be presented with a user interface in the support technician console 106 to perform even the riskiest support operations (e.g., shutting down servers, switches, or firewalls; removing password protections, encrypting/decrypting storage).

The programmatic support constraints are enforced by the support control service 116, which controls the support functions that are made available to the technician through the support technician console 106 may be implemented using high-level program code, binary objects, software libraries, and/or scripts that reflect the policies of the customer enterprise and/or the MSP. In another implementation, programmatic support constraints may be implemented as smart contracts, which are programs or scripts that are stored in a blockchain ledger and are executed when predetermined authentication conditions are met. Smart contracts can automate the execution of an MSP service agreement, MSP company policies, and/or customer enterprise policies to ensure that access to only the authorized support functionality is provided automatically through the support technician console 106 without the involvement of a human intermediary or the delay of manual checks and balances.

Figure 2:
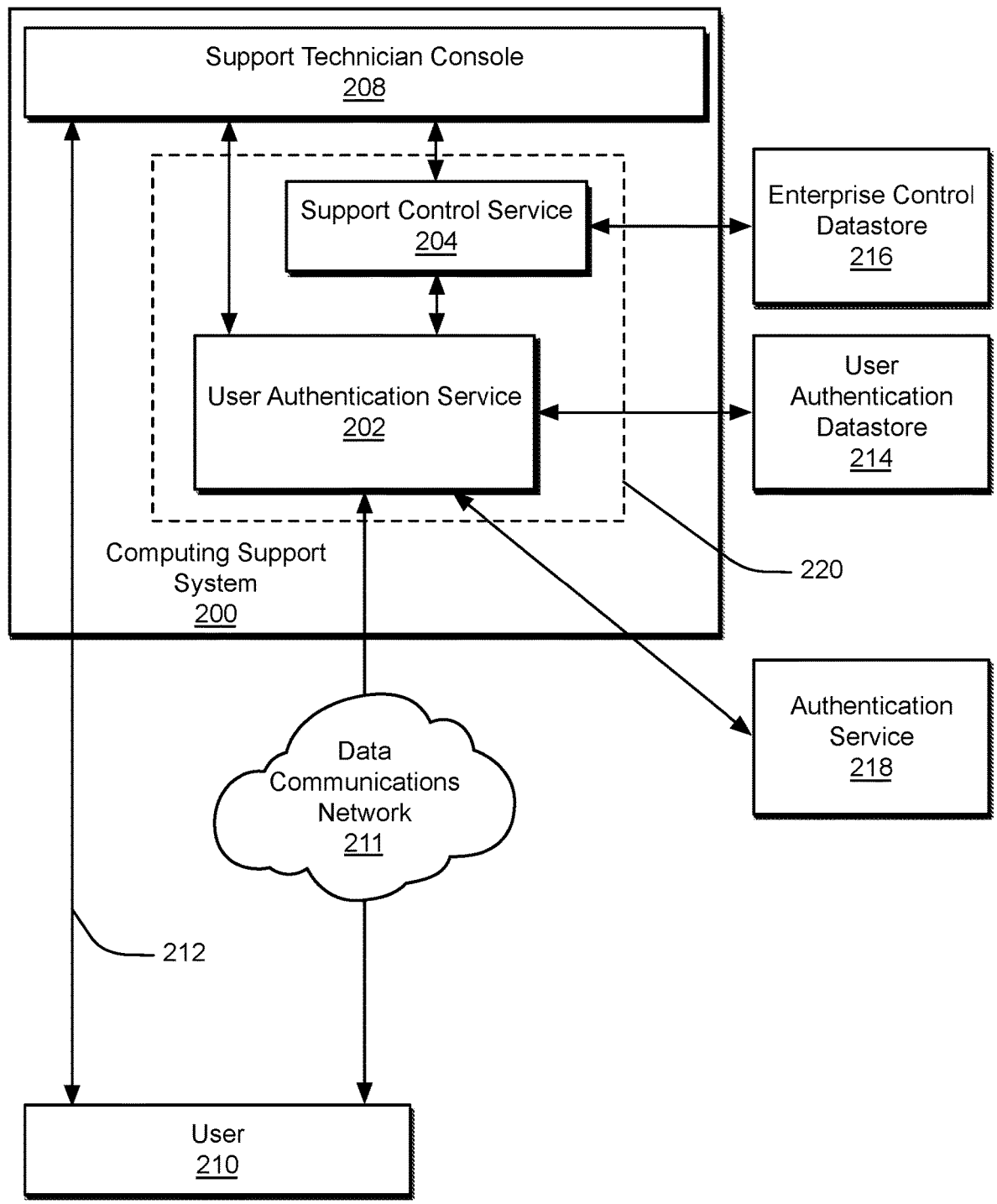
FIG. 2 illustrates an example computing support system in which a user authentication service and a support control service coordinate to enforce constraints on and access to support capabilities according to incremental levels of authentication.

FIG. 2 illustrates an example computing support system 200 in which a user authentication service 202 and a support control service 204 coordinate to enforce constraints on and access to support capabilities according to incremental levels of authentication. The user authentication service 202 and the support control service 204 may be subsystems of a unified authentication and control service 220, although they may be separate, communicatively connected systems in alternative implementations.

It should be understood that an implementation of the described technology may provide two levels of authentication (authenticated or not authenticated), and therefore two levels of support (provide support or do not provide support) or more than two levels of authentication (e.g., based on the number and/or set of authentication factors verified), and therefore more than two levels of support (e.g., based on the verified authentication factors and the identified role of the user within the customer's enterprise). The support control service 204 and the user authentication service 202 may be subsystems of a unified authentication and control service 206, or they may be separate or distributed functions that assist a support technician console 208 in providing appropriate supports actions to authenticated and authorized users. Furthermore, the support controls service and the user authentication service 202 may be integral to or separate from but communicatively connected to the computing support system 200 and the support technician console 208.

A user 210 contacts an MSP helpdesk via a communication channel 212 (e.g., a telephone channel, a data channel), which may or may not traverse a data communications network 211, to obtain computing support from a computing support technician. If the user's problem requires user authentication for the technician to gain access to more in-depth support functions in the support technician console 208, then the technician triggers an authentication action by the user authentication service 202. The level of authentication requested may be dependent upon the requested support functions specified by the technician, or it may be directly specified by the technician. The user authentication service 202 sends one or more authentication challenges pertaining to different authentication factors to the user 210. As described above, such factors may include without limitation username and password, biometric factors, side-channel factors (e.g., texted or emailed codes), verification of an NFT stored on a computing device of the user, and verification through a trusted authenticator application.

The authentication challenges may be multi-part, such as first providing a link to an authentication Web page or service, a response from the user requesting the Web page or service, delivery of the Web page or service to the user's device, and a response from the user that includes the response to the authentication challenges. Other implementations are contemplated.

In another implementation, for example, user identity is verified based at least in part on an NFT. A multi-part authentication challenge requests access to the user's crypto wallet on a user's computing device, and cryptographic keys are exchanged and validated. The NFT has an NFT identifier stored in a crypto wallet of the user (e.g., on a device of the user). The ownership of the NFT would be validated by checking if the NFT identifier in the user's crypto wallet cryptographically matches the actual NFT data stored in a ledger of a user authentication datastore 214 or in a secure datastore otherwise accessible by the user authentication service 202. For example, given an NFT N stored in a crypto wallet W on a known user's device and associated with a known user A via a blockchain ledger (e.g., controlled by the MSP company or a trusted third party), the NFT validation process (e.g., of the user authentication service 202) can authenticate a requesting user as the known user by verifying that:
- the requesting user has possession of and secure access to the crypto wallet W on the device;
- the blockchain ledger in the user authentication datastore 214 (or in a secure datastore otherwise accessible by the user authentication service 202) for NFT N matches the wallet W; and
- the wallet W matches the record for user A in the user authentication datastore 214 (or in a secure datastore otherwise accessible by the user authentication service 202).

Upon NFT validation, a cryptographic signature is transferred to the user authentication service 202 for validation against data stored in a blockchain ledger in the user authentication datastore 214, which is accessible by the user authentication service 202. Other authentication sequences are contemplated. It should be understood that, in the case of an NFT factor, the user is onboarded under the MSP service agreement by generating the NFT, storing it in secure storage of the user's device, and securely recording it in the blockchain of the user authentication datastore 214. In this manner, both the user 210 and the computing support system 200 can use the secure and unique characteristics of the NFT to authenticate the user. Such actions may alternatively be applied in non-MSP scenarios, such as access to Web services, bank accounts, buildings, rooms, secured enclosures, etc.

After a level of authentication has been established for the user 210, the user authentication service 202 obtains an access token (e.g., an OAuth token from a third party authentication service 218) based on the user's response(s) to the authentication challenge(s) and passes the access token, a unique user ID of the authenticated user, and the level of authentication verified to the support control service.

An access token is a string that the support control service 204 (an authentication client) uses to make authenticated requests to an enterprise control datastore 216 (an example authentication server). In some implementations, access tokens may be either "bearer tokens" or "sender-constrained" tokens. A "sender-constrained token" requires the support control service 204 (the authorization client) to prove possession of a private cryptographic key in order to use the access token to access the enterprise control datastore 216, such that the access token by itself would not be usable. Other access token types are contemplated as being supported by the described technology.

In some implementations, there are a number of properties of access tokens that may be relevant to the security model of authentication client and server and the access tokens:

Access tokens are not to be read or interpreted by the authentication client. The authentication client is not the intended audience of the token.

Access tokens do not convey user identity or any other information about the user to the authentication client.

Access tokens should only be used to make requests to the resource server, such as the enterprise control datastore.

The support control service 204 uses the access token, the unique user ID of the authenticated user, and the level of authentication verified to determine the support actions available to the user 210 from the enterprise control datastore 216, based on the level of authentication, the user's identity, the MSP company policies, the customer enterprise policies, and/or the MSP service agreement. The enterprise control datastore 216 returns support control parameters or support control program code (collectively referred to as support control functionality) that enforce the limits on the support actions available to the technician (for the user 210) through the support technician console 208. For example, if a customer employee with a high level of computing system authority achieves a high level of authentication, then the support technician console 208 presents the technician with a vast array of potentially risky support functions, which the high-level user has been entrusted to authorize through the elements of the enterprise control data store. In contrast, if a customer employee with a low level of computing system authority achieves a low level of authentication, then the support technician console 208 presents the technician with a very limited array of potentially risky support functions.

In another implementation, the enterprise control datastore 216 stores a smart contract representing one or more of the MSP company policies, the customer enterprise policies, and/or the MSP service agreement. In this implementation, the submission of the access token, a unique user ID of the authenticated user, and the level of authentication verified to the support control service to the enterprise control datastore 216 satisfies conditions of the smart contract, which automatically executes the corresponding program code to present the authorized support functions corresponding to the user 210. For example, the smart contract can execute code to provide a more limited or less limited user interface to the technician through the support technician console 208.

Figure 3:
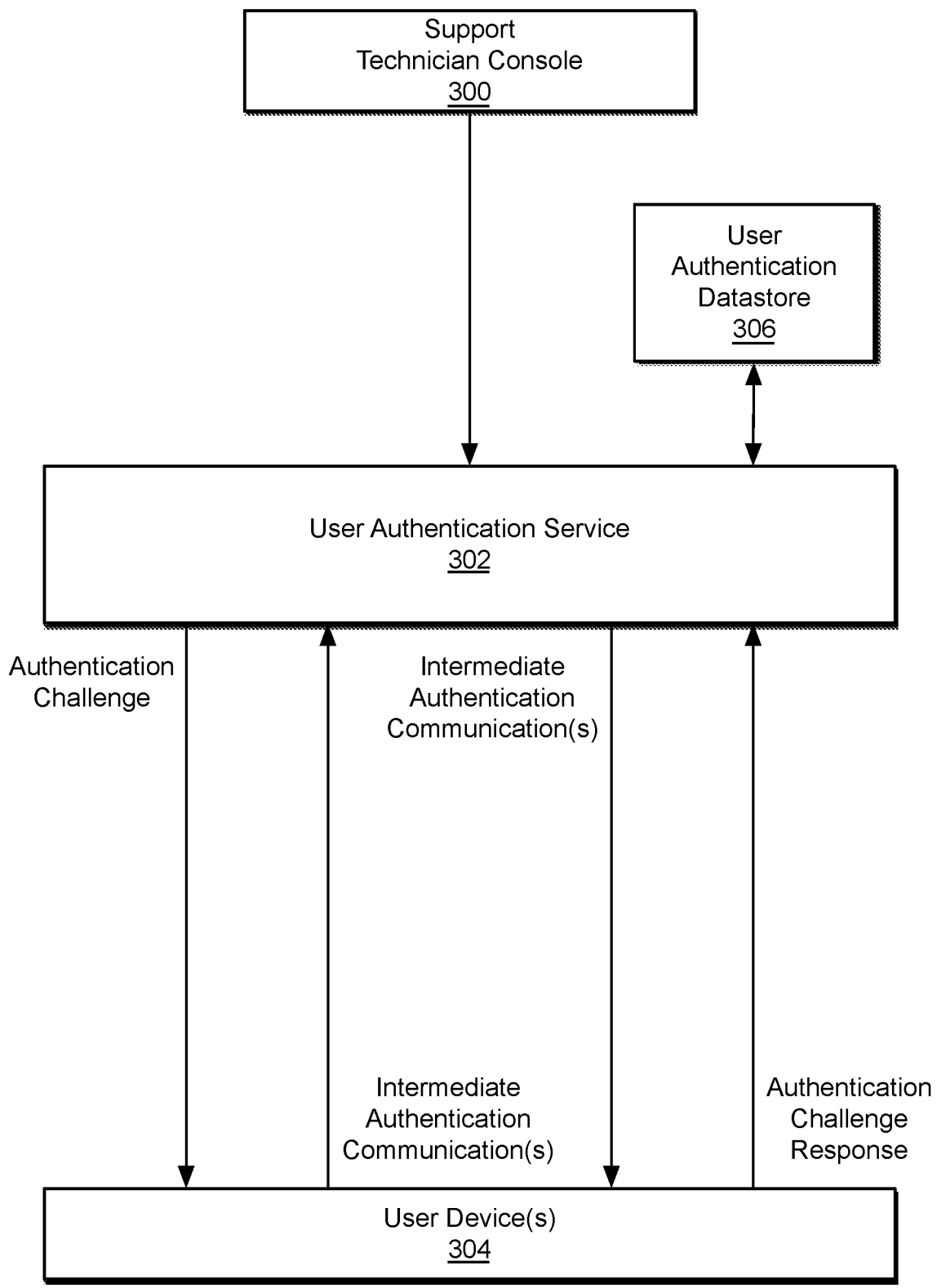
FIG. 3 illustrates communications within an authentication aspect of an example computing support system.

FIG. 3 illustrates communications within an authentication aspect of an example computing support system. It is assumed that the user has contacted the MSP helpdesk for support, although similar communications may be applied in a non-MSP helpdesk context. The support technician requests through a support technician console 300 that a user authentication service 302 attempts to authenticate the user, the level of which may be guided by the technician's request or by the type of support functions the technician has attempted to activate.

In one implementation, responsive to a request for user authentication (e.g., from the support technician console 300 or another origin), the user authentication service 302 issues one or more authentication challenges (e.g., a resource link, a request to access the user's wallet) to one or more of the user devices 304. For example, in the event of a simple email issue that is not impacted by credentials, the user authentication service 302 may dispatch a basic code via email or text as one or more of the authentication factors. In contrast, shutting down business-critical infrastructure may require a specific user class and authentication via a specified combination of authentication factors, such as a combination including an NFT or biometric input prompted via a resource link or a wallet access request depending on input from the user authentication datastore 306 (which may house organizational restrictions as well as depending on contract or smart contract). Some organizations may require multiple forms of authentication chained in succession depending on a given smart contract or user limitations from 306. Another example may include a user who has lost access to the device that would allow them to verify their NFT. In this case, for example, there may be an option that is based on indications in the user authentication datastore 306 to allow an email code as a first challenge and then a follow up of a link to provide biometric data (e.g., retinal scan, fingerprint, etc.) and/or verification by another privileged user at the business.

At least one of the user devices 304 can respond with one or more intermediate authentication challenge responses, such as an activation of the link to request a user interface from the user authentication service 302, a response to the request for access to a crypto wallet, requests for or exchanges of crypto keys, etc. The user authentication service 302 responds with one or more intermediate authentication challenges of its own, such as the requested user interface (e.g., in HTML, form), responses to requests for or exchanges of crypto keys, etc. Such communications between the user authentication service 302 and the one or more user devices 304 may include multiple rounds of communications or may be omitted if unnecessary for authentication of a particular factor. At the end of the authentication sequence, one or more of the user devices 304 transmit an authentication challenge response to the authentication challenge to complete the challenge for a given authentication factor. Validation of other authentications factors may be performed in sequence or in parallel.

The user authentication datastore 306 stores specific information corresponding to the user (e.g., cryptographic keys, email addresses, mobile phone numbers, identities, name, role, personnel data) and the authentication of the user (e.g., responses to security questions, NFT-related data, a blockchain ledger relevant to authentication), but it may also provide some degree of support access based on one or more enterprise policies contained in an enterprise control datastore.

Having completed the authentication operation, the user authentication service 302 submits its authentication result to a support control service (not shown). The result may include one or more of an access token, a unique user ID of the authenticated user, and the level of authentication (e.g., based at least in part on the number and/or combination of authentication factors satisfied). The support control service then uses some or all of the result information to determine how much support access the technician will have to the user's computing device(s). In at least one implementation, the support control service can programmatically enforce any limits on the technician's support access to the user's computing device(s), such as by setting restricted parameters in the RMM and or other components of the support technician console that select which support functions are available to the technician in this support session with this user. Other methods of restricting the technician's support access are contemplated as well.

Figure 4:
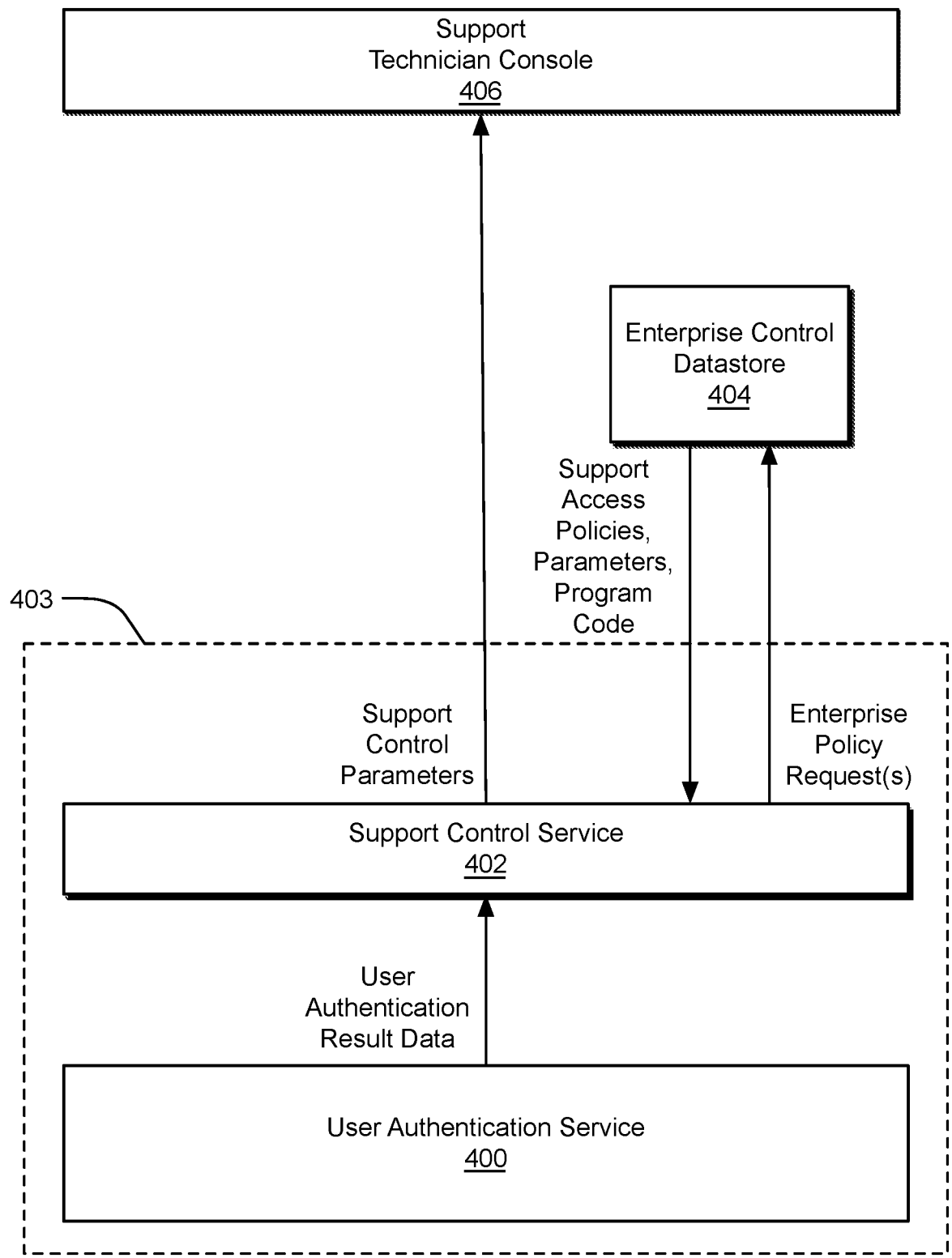
FIG. 4 illustrates communications within a support control aspect of an example computing support system.

FIG. 4 illustrates communications within a support control aspect of an example computing support system. A user authentication service 400 and a support control service 402 may be subsystems of a unified authentication and control service 403, although they may be separate, communicatively connected systems in alternative implementations. The user authentication result data is passed from the user authentication service 400 to the support control service 402. The user authentication result data may include without limitation one or more of the following: identification information regarding the user, the challenge type(s), and the level of authentication achieved. Other information may also be included in the user authentication result data, such as the unique identifiers (e.g., factor codes) used, the requested access, etc., depending on the specific access methods and previous user authentication process. The support control service 402 queries an enterprise control datastore 404 with one or more enterprise policy requests for one or more applicable support access policies, parameters, and/or program code (collectively, support access policies) based on the user and the authentication result data. The applicable access policies may instructionally or programmatically limit the support access the technician is allowed to provide to the authenticated user. The support control service 402 may also query a policy contract or smart contract for support details (e.g., a user may only access email support and basic software troubleshooting), allow for limited support access to a specific computing device, at a specific site for an organization, and/or for selected or all company organizations, etc.

The support access policies may include without limitation one or more of the following to instructionally or programmatically limit the support access the technician is allowed to provide to the authenticated user: support control instructions, support control parameters set, and/or program code for controlling a support technician console 406, which either allows or denies the necessary access or provides access based on the policy. For example, in one implementation, the default support access available to a user's computer system enforces no support access (e.g., by presenting the technician with no user interface functions for effecting such support access) through a support technician console 406.

In the meantime, the user authentication service 400 withholds an MFA access token until the user has been authenticated, at which time the user authentication service 400 passes the MFA access token to the support control service 402, which queries the enterprise control datastore to obtain the support access policies for enabling select user interface functions in the support technician console 406. The support technician console 406 or the policies, parameters, and/or program code themselves can therefore instructionally or programmatically limit the support access the technician is allowed to or able to provide to the authenticated user.

For example, setting restricted parameters and/or executing or presenting limited user interface functionality in the RMM and or other components of the support technician console 406 that select which support access functions are available to the technician in this support session with this user. In another example, a condition of a smart contract in or accessible to the enterprise control datastore 404 can be satisfied by the enterprise policy request, which can include some or all of the user authentication result data, thereby causing smart contract program code to be executed automatically programmatically enforce the limits on support access by the technician through the user support console service. In other implementations, the smart contract program code may also issue alerts or updates to a ticketing system, an admin console or log, etc. or present instructions to the technician through the support technician console 406.

Figure 5:
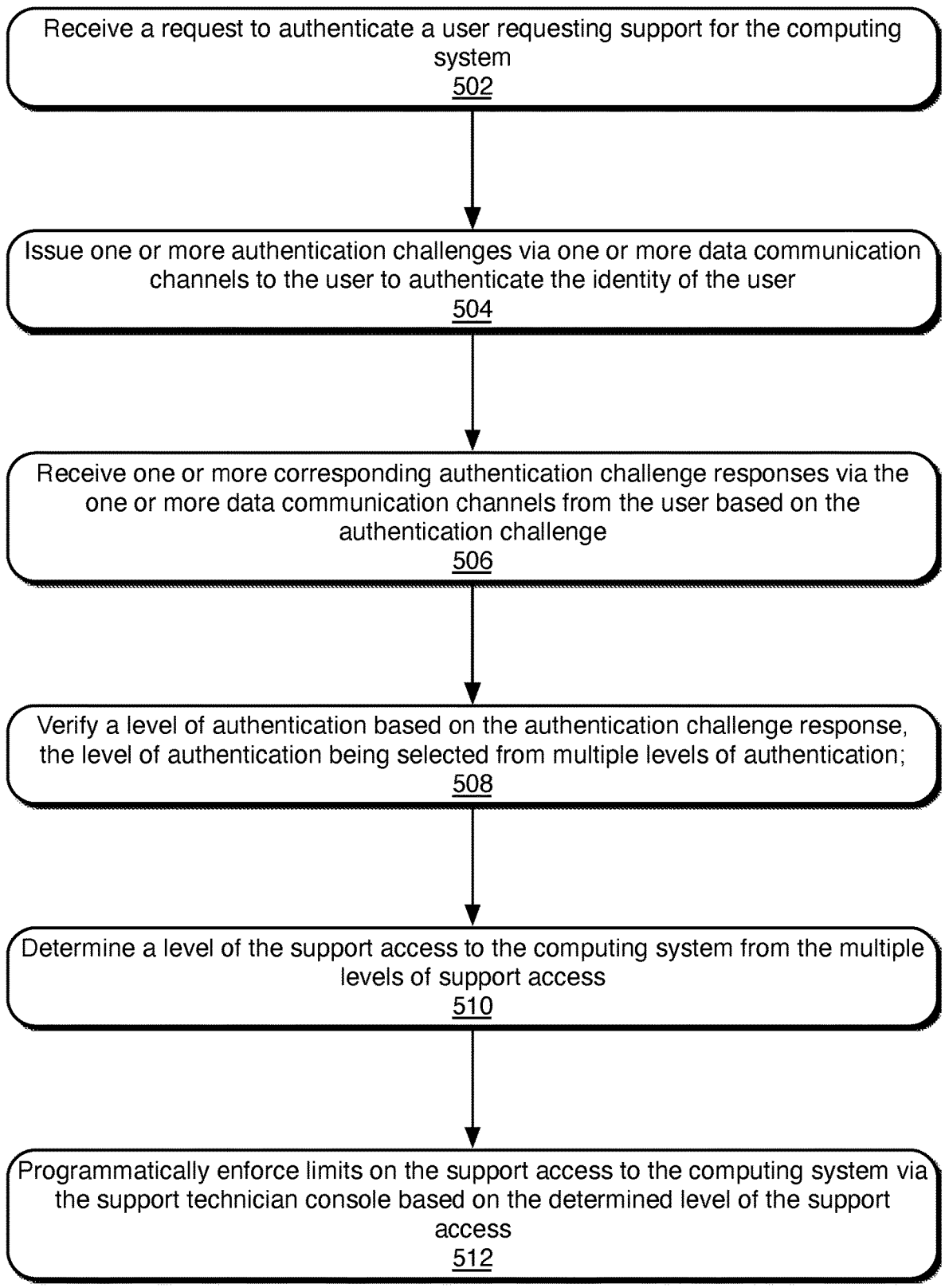
FIG. 5 illustrates example operations of a computing support system providing programmatic management of support access to a computing system via a support technician console.

FIG. 5 illustrates example operations of a computing support system providing programmatic management of support access to a computing system via a support technician console across multiple levels of support access including base-restriction support access and multiple levels of granted support access. In various implementations, for example, base-restriction support access may include no granted support access or some base-level of granted support access, such as access that does not threaten the security of the computing systems. A receiving operation 502 receives a request to authenticate a user requesting support for the computing system, such as through a communication interface. The request includes the identity of the user. For example, a technician at a support technician console can trigger a request through the console to a user authentication service. In another alternative, the request can originate from another source, such as the user, a third-party authentication service, an ERP tool, etc. A challenge operation 504 issues one or more authentication challenges via one or more data communication channels to the user to authenticate the identity of the user, such as through a communication interface. Another receiving operation 506 receives one or more corresponding authentication challenge responses via the one or more data communication channels from the user based on the authentication challenge, such as through a communication interface.

A verifying operation 508 verifies a level of authentication based on the authentication challenge response, the level of authentication being selected from multiple levels of authentication. In one implementation, a different number or combination of authentication factors that have been successfully verified determines which level of authorization the user has achieved. A determining operation 510 determines a level of support access to the computing system from the multiple levels of support access, the level of support access being determined based on the verified level of authentication and the identity of the user. For example, if the user fails all of the authentication factors, then the user may be assigned a level of authentication corresponding to base-restriction support access (by the technician). In contrast, if the user passes some or all of the requested authentication factors or a select subset of the authentication factors, then the user may be assigned a level of authentication corresponding to some granted support access (by the technician), even to the point of full support access, as controlled by policies recorded in an enterprise control datastore.

In addition, the user's identity and optionally the user's corresponding role in the customer's enterprise can influence the level of support access granted to the technician. For example, a fully authenticated user with the role of receptionist may qualify the technician for very limited support access. In contrast, an unauthenticated or narrowly authenticated user in the role of CEO may also only qualify the technician for very limited support access. The influence of the user's identity and corresponding role in the customer's enterprise on the level of support access allowed to the technician is controlled by policies recorded in an enterprise control datastore. A mapping between the user's identity and one or more of the user's roles may be recorded in a user authentication datastore.

Based on the determined level of support access, an enforcement operation 512 programmatically enforces limits on the support access to the computing system via the support technician console. In one implementation, the technician accesses the user's computer system via a user interface (such as in an RMM application). The enforcement operation 512 may input parameters or program code to the support technician console limiting which user interface controls are available or activated for the technician in the support technician console to access the user's computer system for support. For example, the technician may be able to activate a password reset function, but a function for decrypting a storage device may be greyed out or not displayed in the user interface of the support technician console. In this manner, the technician cannot bypass the limitations enforced by the user authentication service, the user authentication datastore, the support control service, and the enterprise control datastore.

Figure 6:
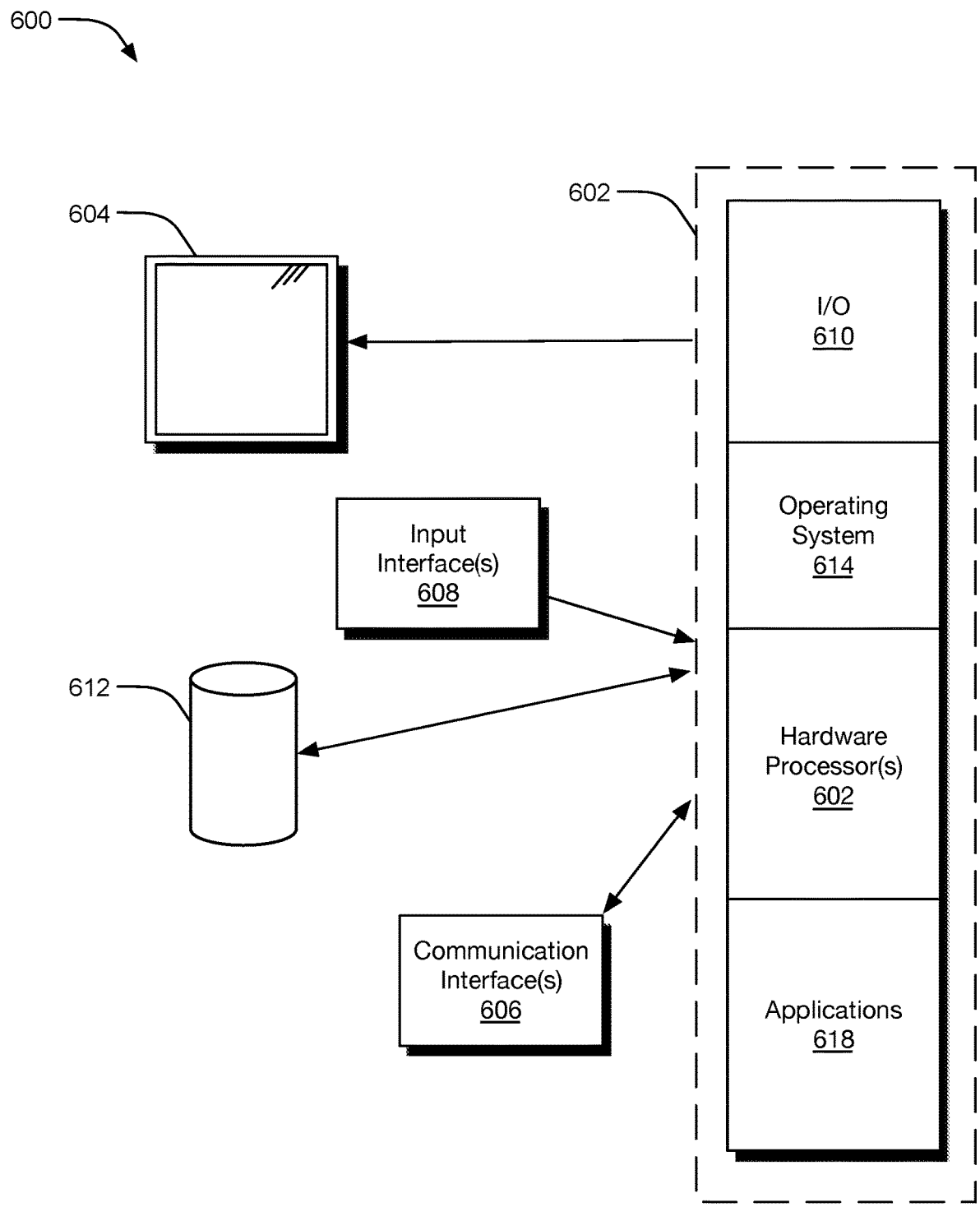
FIG. 6 illustrates an exemplary computing device for implementing the features and operations of the described technology.

FIG. 6 illustrates an exemplary computing device for implementing the features and operations of the described technology. Other computing device architectures are possible, including architectures with more or fewer components. In some implementations, the computing device 600 includes one or more hardware processors 602 (e.g., Intel multicore 64-bit processors, Advanced RISC Machine processors), one or more output interfaces 604 (e.g., an LCD or LED display), one or more communications interfaces 606 (e.g., a wireless communications interface, an Ethernet adapter), one or more input interfaces 608 (e.g., mouse, keyboard, touch-sensitive display), one or more input-output subsystems 610, and one or more processor-readable storage media 612 (e.g., RAM, ROM, SDRAM, SSD, hard disk, optical disk, flash memory, etc.). These components can exchange communications and data over one or more communication channels (e.g., buses), which can utilize various hardware and software for facilitating the transfer of data and control signals between components.

The term "processor-readable storage medium" refers to a storage medium storing instructions that can be read by a processor-based system or computer and providing instructions to the hardware processors 602 for execution, including without limitation, nonvolatile media (e.g., optical, solid-state, or magnetic disks), volatile media (e.g., memory) and transmission media. Transmission media includes, without limitation, coaxial cables, copper wire, and fiber optics. The term "processor-readable storage medium" also excludes transitory signals and signals-per-se.

Processor-readable storage media 612 can further include operating system 614 (e.g., a Microsoft Windows operating system, a macOS or iOS operating system, an Android operation system, a Linux operating system), one or more network communications software, one or more processor-executable applications 618, a support technician console, a support control service, a user authentication service, a smart contract, and other processor-executable modules. The operating system 614 can be multi-user, multiprocessing, multitasking, multithreading, real-time, etc. The operating system 614 performs basic tasks, including but not limited to: recognizing input from the one or more input interfaces 608, receiving input and providing output to the one or more communications interfaces 606, and providing output to the one or more output interfaces 604; keeping track and managing files and directories on processor-readable storage media 612 (e.g., memory or a storage device); controlling peripheral devices; and managing traffic on the one or more communication channels. The network communications software can include various components for establishing and maintaining network connections (e.g., software for implementing communication protocols, such as TCP/IP, HTTP, etc.).

The computing device 600 can be implemented in a parallel processing or peer-to-peer infrastructure or on a single device with one or more processors. Software can include multiple software components or can be a single body of code. One or more power sources and/or power interfaces supply power to the computing device 600.

The described features can be implemented advantageously in one or more computer programs that are executable on a programmable system, including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language or script (e.g., C, C++, C #, Objective-C, Java, Swift, Python, Javascript), including compiled or interpreted languages, and it can be deployed in any form, including as a stand-alone program or as a module, component, subroutine, a browser-based web application, or another unit suitable for use in a computing environment. Various datastores of or accessible by the computing device 600 may store smart contracts, NFTs, user data, access tokens, user identifiers, support control policies, etc.

Suitable processors for the execution of a program of instructions include, by way of example, both general and special purpose microprocessors, and the sole processor or one of multiple processors or cores, of any kind of computer. Generally, a processor will receive instructions and data from a read-only memory, a random-access memory, or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; solid-state drives (SSDs); magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as an LED (light-emitting diode) display or LCD (liquid crystal display) monitor or a high-definition display device for displaying information to the user, and a touch screen input device or a keyboard and a pointing device, such as a mouse or a trackball, by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication, such as a communication network. Examples of communication networks include, e.g., a LAN, a WAN, and the computers and networks forming the Internet.

The computing system can include clients and servers. A client and server are generally remote from each other and typically interact through a communication network. The relationship between client and server arises by virtue of computer programs running on the respective computers and having a client-server relationship with each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The computing device 600 may include a variety of tangible processor-readable storage media and intangible processor-readable communication signals. Tangible processor-readable storage can be embodied by any available media that can be accessed by the computing device 600 and includes both volatile and nonvolatile storage media and removable and non-removable storage media. Tangible processor-readable storage media excludes intangible communications signals and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example computerized method of programmatically managing support access to a computing system via a support technician console across multiple levels of support access including base-restriction support access and multiple levels of granted support access is provided. The method includes receiving a request to authenticate a user requesting support for the computing system, the request including an identity of the user, issuing one or more authentication challenges via one or more data communication channels to the user to authenticate the identity of the user, receiving one or more corresponding authentication challenge responses via the one or more data communication channels from the user based on the one or more authentication challenges, and verifying a level of authentication based on the one or more corresponding authentication challenge responses. The level of authentication is selected from multiple levels of authentication. The method further includes determining a level of support access to the computing system from the multiple levels of support access. The level of support access is determined based on the verified level of authentication and the identity of the user. The method further includes programmatically enforcing limits on the support access to the computing system via the support technician console based on the determined level of support access.

Another example computerized method of all preceding methods is provided, wherein programmatically enforcing limits on the support access to the computing system via the support technician console includes presenting a limited set of support access functionality via the support technician console as compared to a full set of support access functionality available via the support technician console, the limited set of support access functionality being based on the determined level of support access.

Another example computerized method of all preceding methods is provided, wherein the multiple levels of authentication include unsuccessful authentication and multiple levels of successful authentication.

Another example computerized method of all preceding methods is provided, wherein the multiple levels of authentication are differentiated based at least in part on a number of authentication factors satisfied by the one or more corresponding authentication challenge responses.

Another example computerized method of all preceding methods is provided, wherein the one or more authentication challenges includes at least one request for a non-fungible token of the user.

Another example computerized method of all preceding methods is provided, wherein the one or more corresponding authentication challenge responses includes the non-fungible token of the user, and verifying a level of authentication based on the one or more corresponding authentication challenge responses includes verifying the non-fungible token of the user against a blockchain ledger record corresponding to the user in a user authentication datastore.

Another example computerized method of all preceding methods is provided, wherein the level of support access determined is further based on one or more policies programmatically implemented in an enterprise control datastore.

Another example computerized method of all preceding methods is provided, wherein the one or more policies programmatically implemented in the enterprise control datastore include one or more of a support service policy to which a support provider and a support customer have agreed, a support provider policy defining support available from the support provider, and a support customer policy defining support available to individual users according to user roles and levels of authentication.

Another example computerized method of all preceding methods is provided, wherein the one or more policies programmatically implemented according to one or more support access policies stored in the enterprise control datastore are implemented in a form of a smart contract that executes program code upon satisfaction of at least one policy condition to programmatically enforce the limits on the support access to the computing system via the support technician console.

Another example computerized method of all preceding methods is provided, wherein the program code executed by the smart contract presents a user interface through the support technician console that allows support access satisfying the determined level of support access and preventing support access that does not satisfy the determined level of support access.

An example computing support system for programmatically managing support access to a computing system via a support technician console across multiple levels of support access including base-restriction support access and multiple levels of granted support access is provided. The system includes one or more hardware processors and a user authentication service executable by the one or more hardware processors and configured to receive an authentication request including an identity of a user, to authenticate the user requesting support for the computing system according to the authentication request, to issue one or more authentication challenges via one or more data communication channels to the user to authenticate the identity of the user, to receive one or more corresponding authentication challenge responses via the one or more data communication channels from the user based on the one or more authentication challenges, and to verify a level of authentication based on the one or more corresponding authentication challenge responses. The level of authentication is selected from multiple levels of authentication. The system further includes a support control service executable by the one or more hardware processors and configured to determine a level of support access to the computing system from the multiple levels of support access. The level of support access is determined based on the verified level of authentication and the identity of the user. The support control service is further configured to programmatically enforce limits on the support access to the computing system via the support technician console based on the determined level of support access.

Another example computing support system of all preceding systems is provided, wherein the support control service is configured to programmatically enforce the limits on the support access to the computing system via the support technician console by presenting a limited set of support access functionality via the support technician console as compared to a full set of support access functionality available via the support technician console, the limited set of support access functionality being based on the determined level of support access.

Another example computing support system of all preceding systems is provided, wherein the one or more authentication challenges includes at least one request for a non-fungible token of the user, the one or more corresponding authentication challenge responses includes the non-fungible token of the user, and the support control service is configured to verify a level of authentication based on the one or more corresponding authentication challenge responses by verifying the non-fungible token of the user against a blockchain ledger record corresponding to the user in a user authentication datastore.

Another example computing support system of all preceding systems is provided, wherein the level of support access determined is further based on one or more policies programmatically implemented according to an enterprise control datastore, the one or more policies including one or more of a support service policy to which a support provider and a support customer have agreed, a support provider policy defining support available from the support provider, and a support customer policy defining support available to individual users according to user roles and levels of authentication.

Another example computing support system of all preceding systems is provided, wherein the one or more policies programmatically implemented according to the enterprise control datastore are implemented in a form of a smart contract that executes program code upon satisfaction of at least one policy condition to programmatically enforce the limits on the support access to the computing system via the support technician console.

Another example computing support system of all preceding systems is provided, wherein the program code executed by the smart contract presents a user interface through the support technician console that allows support access satisfying the determined level of support access and preventing support access that does not satisfy the determined level of support access.

One or more example tangible processor-readable storage media embodied with instructions for executing on one or more processors and circuits of a computing device a process for programmatically managing support access to a computing system via a support technician console across multiple levels of support access including base-restriction support access and multiple levels of granted support access are provided. The process includes receiving a request to authenticate a user requesting support for the computing system, the request including an identity of the user, issuing one or more authentication challenges via one or more data communication channels to the user to authenticate the identity of the user, receiving one or more corresponding authentication challenge responses via the one or more data communication channels from the user based on the one or more corresponding authentication challenges, verifying a level of authentication based on the one or more corresponding authentication challenge responses. The level of authentication is selected from multiple levels of authentication. The process further includes determining a level of support access to the computing system from the multiple levels of support access. The level of support access is determined based on the verified level of authentication and the identity of the user. The process further includes programmatically enforcing limits on the support access to the computing system via the support technician console based on the determined level of support access.

One or more other example tangible processor-readable storage media of any preceding medial claim is provided, wherein programmatically enforcing limits on the support access to the computing system via the support technician console includes presenting a limited set of support access functionality via the support technician console as compared to a full set of support access functionality available via the support technician console, the limited set of support access functionality being based on the determined level of support access.

One or more other example tangible processor-readable storage media of any preceding medial claim is provided, wherein the one or more authentication challenges includes at least one request for a non-fungible token of the user, the one or more corresponding authentication challenge responses includes the non-fungible token of the user, and verifying a level of authentication based on the one or more corresponding authentication challenge responses includes verifying the non-fungible token of the user against a blockchain ledger record corresponding to the user in a user authentication datastore.

One or more other example tangible processor-readable storage media of any preceding medial claim is provided, wherein the level of support access determined is further based on one or more policies programmatically implemented in an enterprise control datastore, the one or more policies programmatically implemented in the enterprise control datastore are implemented in a form of a smart contract that executes program code upon satisfaction of at least one policy condition to programmatically enforce limits on the support access to the computing system via the support technician console by allowing support access satisfying the determined level of support access and preventing support access that does not satisfy the determined level of support access.

An example system of programmatically managing support access to a computing system via a support technician console across multiple levels of support access including base-restriction support access and multiple levels of granted support access is provided. The system includes means for receiving a request to authenticate a user requesting support for the computing system, the request including an identity of the user, means for issuing one or more authentication challenges via one or more data communication channels to the user to authenticate the identity of the user, means for receiving one or more corresponding authentication challenge responses via the one or more data communication channels from the user based on the one or more authentication challenges, and means for verifying a level of authentication based on the one or more corresponding authentication challenge responses. The level of authentication is selected from multiple levels of authentication. The method further includes means for determining a level of support access to the computing system from the multiple levels of support access. The level of support access is determined based on the verified level of authentication and the identity of the user. The method further includes means for programmatically enforcing limits on the support access to the computing system via the support technician console based on the determined level of support access.

Another example system of all preceding systems is provided, wherein means for programmatically enforcing limits on the support access to the computing system via the support technician console includes means for presenting a limited set of support access functionality via the support technician console as compared to a full set of support access functionality available via the support technician console, the limited set of support access functionality being based on the determined level of support access.

Another example system of all preceding systems is provided, wherein the multiple levels of authentication include unsuccessful authentication and multiple levels of successful authentication.

Another example system of all preceding systems is provided, wherein the multiple levels of authentication are differentiated based at least in part on a number of authentication factors satisfied by the one or more corresponding authentication challenge responses.

Another example system of all preceding systems is provided, wherein the one or more authentication challenges include at least one request for a non-fungible token of the user.

Another example system of all preceding systems is provided, wherein the one or more corresponding authentication challenge responses includes the non-fungible token of the user, and means for verifying a level of authentication based on the one or more corresponding authentication challenge responses includes means for verifying the non-fungible token of the user against a blockchain ledger record corresponding to the user in a user authentication datastore.

Another example system of all preceding systems is provided, wherein the level of support access determined is further based on one or more policies programmatically implemented in an enterprise control datastore.

Another example system of all preceding systems is provided, wherein the one or more policies programmatically implemented in the enterprise control datastore include one or more of a support service policy to which a support provider and a support customer have agreed, a support provider policy defining support available from the support provider, and a support customer policy defining support available to individual users according to user roles and levels of authentication.

Another example system of all preceding systems is provided, wherein the one or more policies programmatically implemented according to one or more support access policies stored in the enterprise control datastore are implemented in a form of a smart contract that executes program code upon satisfaction of at least one policy condition to programmatically enforce the limits on the support access to the computing system via the support technician console.

Another example system of all preceding systems is provided, wherein the program code executed by the smart contract presents a user interface through the support technician console that allows support access satisfying the determined level of support access and preventing support access that does not satisfy the determined level of support access.

While this specification contains many specific implementation details, these should not be construed as limitations on the scope of any inventions or of what may be claimed, but rather as descriptions of features specific to particular embodiments of the particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A computerized method of programmatically managing support access to a computing system via a support technician console across multiple levels of support access including base-restriction support access and multiple levels of granted support access, the method comprising:
receiving a request to authenticate a user requesting support for the computing system, the request including an identity of the user;
issuing one or more authentication challenges via one or more data communication channels to the user to authenticate the identity of the user, wherein the one or more authentication challenges include at least one request for a non-fungible token of the user;
receiving one or more corresponding authentication challenge responses via the one or more data communication channels from the user based on the one or more authentication challenges;
verifying a level of authentication based on the one or more corresponding authentication challenge responses, the level of authentication being selected from multiple levels of authentication, wherein the one or more corresponding authentication challenge responses includes the non-fungible token of the user, and verifying a level of authentication based on the one or more corresponding authentication challenge responses includes verifying the nonfungible token of the user against a blockchain ledger record corresponding to the user in a user authentication datastore;
determining a level of support access to the computing system from the multiple levels of support access, the level of support access being determined based on the verified level of authentication and the identity of the user; and
programmatically enforcing limits on the support access to the computing system via the support technician console based on the determined level of support access.

2. The computerized method of claim 1, wherein programmatically enforcing limits on the support access to the computing system via the support technician console comprises:
presenting a limited set of support access functionality via the support technician console as compared to a full set of support access functionality available via the support technician console, the limited set of support access functionality being based on the determined level of support access.

3. The computerized method of claim 1, wherein the multiple levels of authentication include unsuccessful authentication and multiple levels of successful authentication.

4. The computerized method of claim 1, wherein the multiple levels of authentication are differentiated based at least in part on a number of authentication factors satisfied by the one or more corresponding authentication challenge responses.

5. The computerized method of claim 1, wherein the level of support access determined is further based on one or more policies programmatically implemented in an enterprise control datastore.

6. The computerized method of claim 5, wherein the one or more policies programmatically implemented in the enterprise control datastore include one or more of a support service policy to which a support provider and a support customer have agreed, a support provider policy defining support available from the support provider, and a support customer policy defining support available to individual users according to user roles and levels of authentication.

7. The computerized method of claim 5, wherein the one or more policies programmatically implemented according to one or more support access policies stored in the enterprise control datastore are implemented in a form of a smart contract that executes program code upon satisfaction of at least one policy condition to programmatically enforce the limits on the support access to the computing system via the support technician console.

8. The computerized method of claim 7, wherein the program code executed by the smart contract presents a user interface through the support technician console that allows support access satisfying the determined level of support access and preventing support access that does not satisfy the determined level of support access.

9. A computing support system for programmatically managing support access to a computing system via a support technician console across multiple levels of support access including base-restriction support access and multiple levels of granted support access, the computing support system comprising:
one or more hardware processors;
a user authentication service executable by the one or more hardware processors and configured to receive an authentication request including an identity of a user, to authenticate the user requesting support for the computing system according to the authentication request, to issue one or more authentication challenges via one or more data communication channels to the user to authenticate the identity of the user, to receive one or more corresponding authentication challenge responses via the one or more data communication channels from the user based on the one or more authentication challenges, and to verify a level of authentication based on the one or more corresponding authentication challenge responses, the level of authentication being selected from multiple levels of authentication, wherein the one or more authentication challenges include at least one request for a non-fungible token of the user and the one or more corresponding authentication challenge responses includes the non-fungible token of the user; and
a support control service executable by the one or more hardware processors and configured to determine a level of support access to the computing system from the multiple levels of support access, the level of support access being determined based on the verified level of authentication and the identity of the user, and to programmatically enforce limits on the support access to the computing system via the support technician console based on the determined level of support access, wherein the user authentication service is configured to verify a level of authentication based on the one or more corresponding authentication challenge responses by verifying the non-fungible token of the user against a blockchain ledger record corresponding to the user in a user authentication datastore.

10. The computing support system of claim 9, wherein the support control service is configured to programmatically enforce the limits on the support access to the computing system via the support technician console by presenting a limited set of support access functionality via the support technician console as compared to a full set of support access functionality available via the support technician console, the limited set of support access functionality being based on the determined level of support access.

11. The computing support system of claim 9, wherein the level of support access determined is further based on one or more policies programmatically implemented according to an enterprise control datastore, the one or more policies including one or more of a support service policy to which a support provider and a support customer have agreed, a support provider policy defining support available from the support provider, and a support customer policy defining support available to individual users according to user roles and levels of authentication.

12. The computing support system of claim 11, wherein the one or more policies programmatically implemented according to the enterprise control datastore are implemented in a form of a smart contract that executes program code upon satisfaction of at least one policy condition to programmatically enforce the limits on the support access to the computing system via the support technician console.

13. The computing support system of claim 12, wherein the program code executed by the smart contract presents a user interface through the support technician console that allows support access satisfying the determined level of support access and preventing support access that does not satisfy the determined level of support access.

14. One or more tangible processor-readable storage media embodied with instructions for executing on one or more processors and circuits of a computing device a process for programmatically managing support access to a computing system via a support technician console across multiple levels of support access including base-restriction support access and multiple levels of granted support access, the process comprising:
  receiving a request to authenticate a user requesting support for the computing system, the request including an identity of the user;
  issuing one or more authentication challenges via one or more data communication channels to the user to authenticate the identity of the user, wherein the one or more authentication challenges include at least one request for a non-fungible token of the user;
  receiving one or more corresponding authentication challenge responses via the one or more data communication channels from the user based on the one or more corresponding authentication challenges;
  verifying a level of authentication based on the one or more corresponding authentication challenge responses, the level of authentication being selected from multiple levels of authentication, wherein the one or more corresponding authentication challenge responses includes the non-fungible token of the user, and verifying a level of authentication based on the one or more corresponding authentication challenge responses includes verifying the nonfungible token of the user against a blockchain ledger record corresponding to the user in a user authentication datastore;
  determining a level of support access to the computing system from the multiple levels of support access, the level of support access being determined based on the verified level of authentication and the identity of the user; and
  programmatically enforcing limits on the support access to the computing system via the support technician console based on the determined level of support access.

15. The one or more tangible processor-readable storage media of claim 14, wherein programmatically enforcing limits on the support access to the computing system via the support technician console comprises:
  presenting a limited set of support access functionality via the support technician console as compared to a full set of support access functionality available via the support technician console, the limited set of support access functionality being based on the determined level of support access.

16. The one or more tangible processor-readable storage media of claim 14, wherein the level of support access determined is further based on one or more policies programmatically implemented in an enterprise control datastore, the one or more policies programmatically implemented in the enterprise control datastore are implemented in a form of a smart contract that executes program code upon satisfaction of at least one policy condition to programmatically enforce limits on the support access to the computing system via the support technician console by allowing support access satisfying the determined level of support access and preventing support access that does not satisfy the determined level of support access.

* * * * *